Heinz Schäffersmann
INVENTOR.

BY
Karl F. Ross
Attorney

May 26, 1970    H. SCHAFFERSMANN    3,514,684
REGULATING SYSTEM FOR INDUCTION MOTOR
Filed Dec. 9, 1966    2 Sheets-Sheet 2

INVENTOR:
Heinz Schäffersmann
BY
Karl G. Ross
Attorney

United States Patent Office 3,514,684
Patented May 26, 1970

3,514,684
REGULATING SYSTEM FOR INDUCTION MOTOR
Heinz Schaffersmann, Bielefeld, Germany, assignor to Firma Schleicher Regelautomatik G.m.b.H., Bielefeld, Germany, a corporation of Germany
Filed Dec. 9, 1966, Ser. No. 600,637
Claims priority, application Germany, May 31, 1966, 1,273,058
Int. Cl. H02p 7/62
U.S. Cl. 318—227                  9 Claims

ABSTRACT OF THE DISCLOSURE

Speed-regulating system for induction motor, particularly 3-phase motor, wherein one phase winding is unregulated and is used to generate a control voltage dependent on the slip of the rotor, this control voltage serving to regulate the current flow in the remaining phase winding or windings which preferably are interconnected in a single series circuit; the latter may include a pair of oppositely poled electronic gates (solid-state thyratrons) connected in parallel and responsive to the control voltage from the unregulated phase.

---

My present invention relates to a system for regulating the speed of an induction motor with at least two phase windings energized from a polyphase source of alternating current.

In the absence of special control means, and given a power supply of substantially constant voltage, the rotor speed of an induction motor varies with the load between zero (100% slip) in the case of overload and near-synchronous speed (negligible slip) under idling conditions. It is often necessary, however, to maintain a substantially constant rotor speed over a wide range of loads or to change that speed in a manner independent of load. Prior speed-regulating systems for this purpose have been cumbersome and uneconomical, particularly in the case of 3-phase motors of relatively small capacity (e.g. up to about 10 kw.).

It is, therefore, the general object of my present invention to provide an improved regulating system for induction motors which is efficient in operation and simple in its construction.

A more particular object of my invention is to provide a regulating system of this type which can be used on conventional 3-phase induction motors without necessitating any material changes on either the motor or its power supply.

These objects are realized, pursuant to the present invention, by the provision of a regulating system which includes a first circuit connecting one phase of the A-C power supply across one phase winding of the motor, a second circuit connecting the remaining phase or phases of the power supply across the other phase winding or windings of the motor, and circuit means responsive to the current flow in the first circuit for actuating a control means, preferably a pair of electronic gates, in the second circuit to regulate the rotor speed through a modification of the rate of energization of the last-mentioned phase winding or windings by the associated phase or phases of the power supply.

With an arrangement of this description, the current traversing the first-mentioned phase winding of the motor is unregulated and depends in its magnitude on the slip of the rotor. This current, therefore, can be utilized in accordance with my present invention to change the rate of energization of the other phase winding or windings in a sense counteracting the deviation of the rotor speed from a predetermined value. Naturally, a small residual deviation must exist for the regulation to be effective, yet this residue can be held within very narrow limits through the use of sensitive electronic gates such as solid-state thyratrons (also known as "thyristors") represented, for example, by conventional silicon controlled rectifiers.

Although in principle it would be possible to control individually the energization of all but one winding of a polyphase induction motor by the means described, I have found in accordance with a further feature of this invention that a greatly simplified arrangement can be obtained if, in the case of a 3-phase motor, the two phase windings other than the unregulated one are serially connected between the associated phase conductors of the power supply so as to constitute, in effect, a single regulated winding co-operating with the unregulated winding to constitute a 2-phase stator. As the unregulated winding then supplies substantially all the needed induction current, the regulated phase current need vary only in conformity with the changing torque requirements so that the latter phase constitutes a substantially ohmic impedance for the control circuit, thus enabling a more efficient use of solid-state thyratrons.

The input voltage to the control circuit derived from the unregulated phase may be balanced by a reference voltage designed to establish a predetermined rotor speed at normal load. This reference voltage may therefore also be used to vary the rotor speed at the will of an operator or to help further stabilize that speed by being taken from the output of a generator whose terminal voltage depends on the motor speed and which therefore may be coupled directly with the rotor shaft.

The above and other features of my invention will become more fully apparent from the following detailed description and the accompanying drawing in which.

Figure 1:
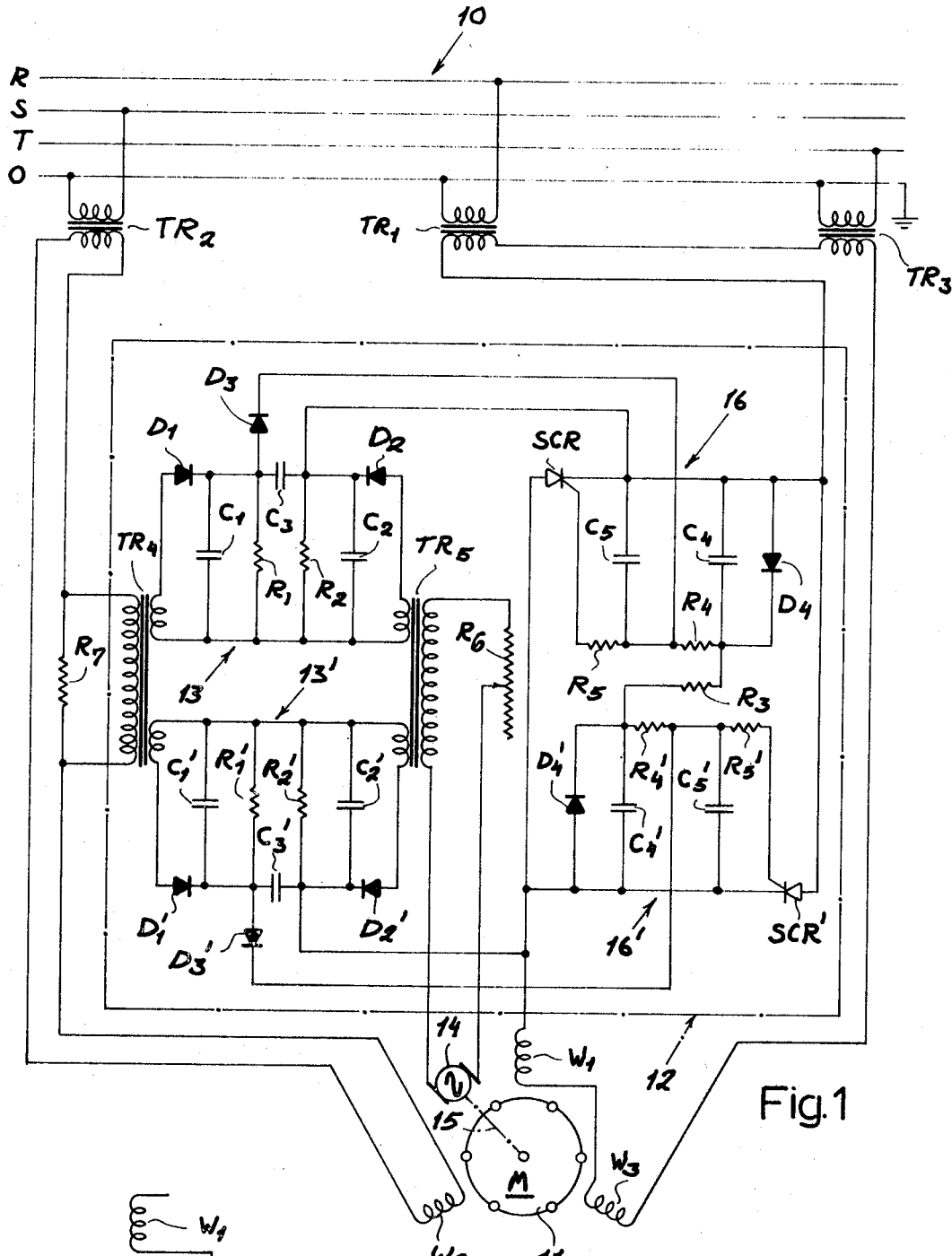
FIG. 1 is a circuit diagram of a regulating system for a 3-phase induction motor according to my invention.

In FIG. 1 I have shown a system comprising a power supply 10 with three phase conductors R, S, T and a grounded neutral conductor O. An induction motor M has the usual cage-type rotor 11 and a stator with three phase windings $W_1$, $W_2$ and $W_3$. Winding $W_2$ is directly energized from conductor S of the power supply via an input transformer $TR_2$. Windings $W_1$ and $W_2$ are serially interconnected and are jointly energized from phase conductors R and T via respective input transformers $TR_1$ and $TR_3$ whose secondaries are also connected in series through a control network generally designated 12.

The circuit extending between transformer $TR_2$ and winding $W_2$ includes a resistor $R_7$ bridged by the primary of a transformer $TR_4$ having two secondaries in a pair of integrating networks 13, 13' which also receive a reference voltage via respective secondaries of another transformer $TR_5$ connected across the output of an A-C generator 14. An adjustable regulating resistor $R_6$ is connected in series with the primary of transformer $TR_5$ in the output circuit of generator 14 which is shown driven by the rotor shaft 15 of motor M.

Integrating circuit 13 comprises a pair of time-constant networks $C_1$, $R_1$ and $C_2$, $R_2$ respectively energized from transformers $TR_4$ and $TR_5$ via diodes $D_1$, $D_2$, the two networks being separated by a condenser $C_3$. Integrating circuit 13' is identical with circuit 13, its components being designated by the same reference characters with addition of a prime mark.

The circuit connecting windings $W_1$ and $W_3$ across the secondaries of phase transformers $TR_1$ and $TR_3$ includes a pair of silicon controlled rectifiers SCR and SCR' inserted with mutually opposite polarities in two parallel paths. The gate-cathode circuit of element SCR comprises a filter network 16 which includes two series resistors $R_4$ and $R_5$, two shunt condensers $C_4$, $C_5$ and a series diode $D_4$. Shunt condenser $C_5$, connected between the cathode of element SCR and the junction of resistors $R_4$ and $R_5$, lies in parallel with condenser $C_3$ of network 13 with interposition of a further diode $D_3$. The element SCR' has an identical gate-cathode circuit 16' (with primed components designated analogously to those of circuit 16) whose shunt condenser $C_5'$ is connected in parallel with condenser $C_3'$ of network 13' through the intermediary of a diode $D_3'$.

In operation, the energization of winding $W_2$ alone may suffice to keep the rotor 11 idling at a predetermined speed established by the setting of resistor $R_6$. This will be so if, under the assumed conditions, the unregulated current in phase winding $W_2$ is so small that the voltage developed across condensers $C_1$ and $C_1'$ is insufficient to overcome the counteracting voltage across condensers $C_2$, $C_2'$, derived from generator 14, which is of such polarity as to keep the controlled rectifiers SCR and SCR' cut off. If, now, the load is increased, more current will be drawn by winding $W_2$ and the gates of elements SCR and SCR' will be biased more positively so that these elements begin to conduct during part of a cycle, thereby energizing the serially connected stator windings $W_1$ and $W_3$ to provide the additional torque needed for entrainment of the load. The resulting reduction in rotor speed, however small, leads to a decrease of the terminal voltage of generator 14 so that the counterbalancing voltage developed across networks $R_2$, $C_2$ and $R_2'$, $C_2'$ is reduced for a still further increase in the rate of energization of the regulated windings $W_1$ and $W_3$; if this additional compensation is not needed, the generator 14 may be operated at constant speed independently of rotor 11. In either case, the operator may further control the rotor speed (e.g. for the purpose of holding the same completely constant) by manipulating the resistor $R_6$. With maximum load and minimum slip, the controlled rectifiers SCR and SCR' are continuously conductive.

Figure 2:
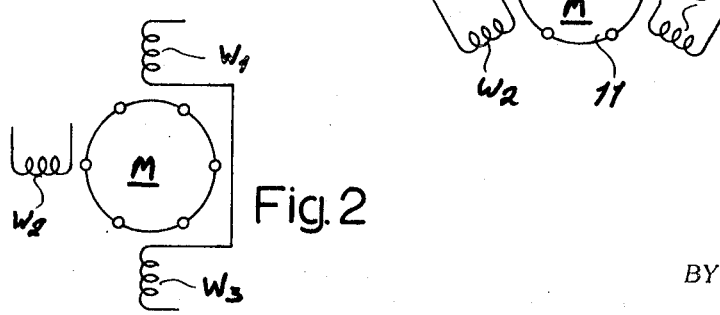
FIG. 2 is a diagrammatic view showing a modification of the motor illustrated in FIG. 1.
Figure 3:
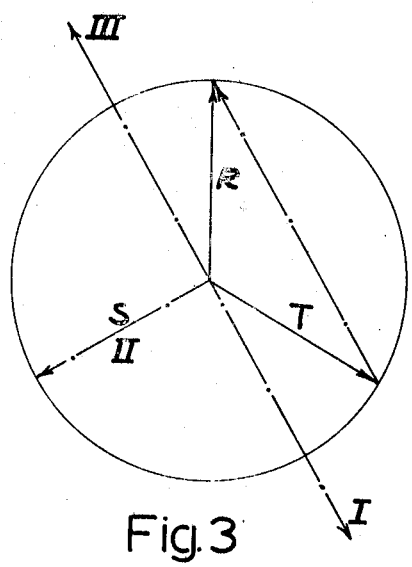
FIG. 3 is a vector diagram relating to the system of FIG. 1.

In FIG. 3 I have shown a vector diagram illustrating the phase currents of conductors R, S and T along with vectors I, II and III representing the currents in windings $W_1$, $W_2$ and $W_3$, respectively, it being assumed that controlled rectifiers SCR and SCR' of FIG. 1 are fully open. It will be seen that vectors I and III, representing the resultant of the differentially combined vectors R and T (in direction though not necessarily in magnitude), lie at right angles to the vector II which is in phase with vector S; the possibility of a small phase shift by the primary winding of transformer $TR_4$ has been disregarded in this diagram. Though vectors I and III represent the same current, they are of opposite polarities owing to the mode of interconnection of windings $W_1$ and $W_3$. With the geometrical arrangement shown in FIG. 1, where the stator windings of motor M have the conventional mutual separation of 120° (electrical), only a component of vectors I and III will be effective in creating a rotating magnetic field. On the other hand, as shown in FIG. 2, windings $W_1$ and $W_3$ could also be disposed in mutual alignment and transversely to winding $W_2$ so that the geometrical position of these windings corresponds to the angular relationship of their phase vectors.

Figure 4:
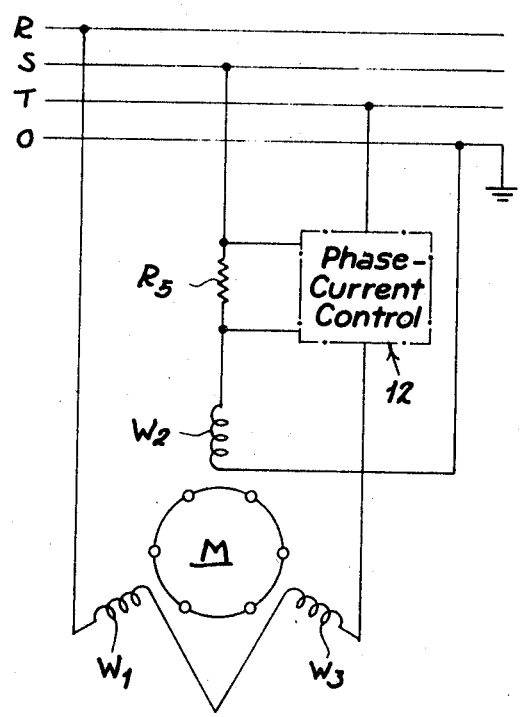
FIGS. 4 and 5 are circuit diagrams generally similar to that of FIG. 1 but showing two alternate embodiments.

In FIG. 4 I have shown an arrangement generally similar to that of FIG. 1 except for the omission of input transformers $TR_1$, $TR_2$ and $TR_3$, winding $W_2$ being connected directly between phase conductor S and neutral conductor O. The control network 12, here shown only schematically, operates in the same manner as before and the vector diagram of FIG. 3 is equally applicable.

Figure 5:
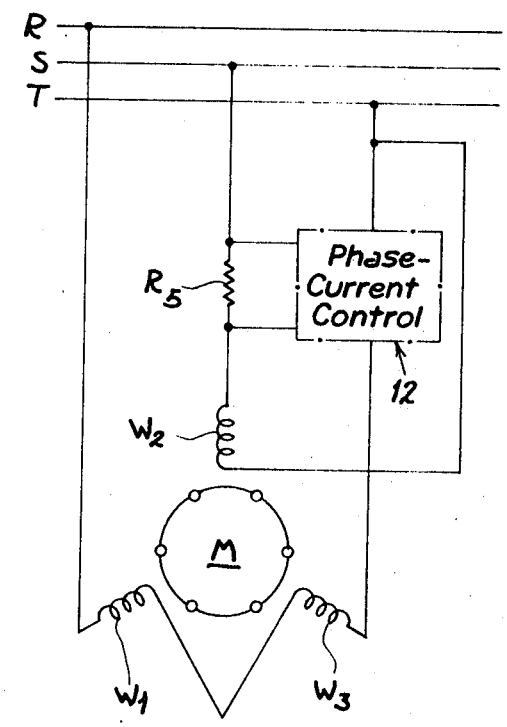
Figure 6:
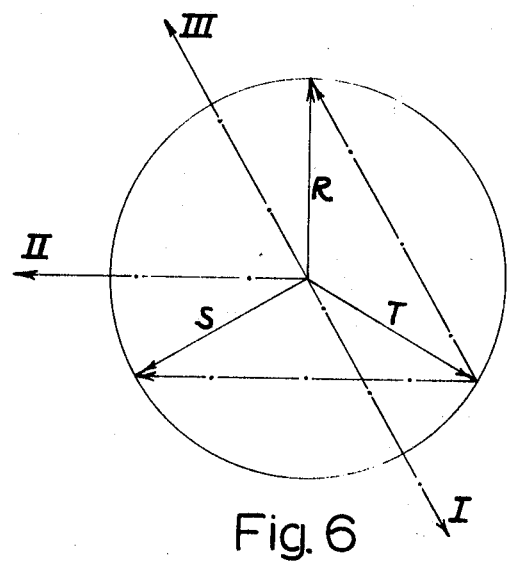
FIG. 6 is a vector diagram relating to the system of FIG. 5.

FIG. 5 illustrates a further modification in which the power supply is connected in Δ rather than Y to the system. Windings $W_1$ and $W_3$ are still connected between phase conductors R and T, in series with control network 12, whereas winding $W_2$ now lies between phase conductors S and T. The resulting vector diagram of FIG. 6 shows the vectors I and III including angles of 120° and 60°, respectively, with vector II. Again, if desired, the corresponding stator windings could be shifted into the same relative geometrical position for optimum utilization of the current flow therethrough.

It will be apparent that the primaries of transformers $TR_1$, $TR_2$ and $TR_3$ in FIG. 1 could also be connected in Δ across the associated power supply 10, with no change in the operation of the system.

In practice, the current drawn by the unregulated phase (winding $W_2$) may develop as little as 20% of the rated torque so that only a small supplemental current through the regulated phase windings will be needed to handle a minimum load amounting to, say, 30% of the normal load. With a maximum torque of 180% of the rated value readily obtainable, the system may operate over a load range of 6:1 or even more.

I claim:
1. A regulating system for an induction motor with at last two phase windings, comprising a polyphase source of alternating current, a first circuit connecting one phase of said source across one of said phase windings, a second circuit connecting at least one other phase of said source across at least one other of said phase windings, control means in said second circuit, and circuit means in said first circuit responsive to current flow in said one of said phase windings for actuating said control means to regulate the speed of said motor through modification of the rate of energization of said other of said phase windings by said other phase of said source.

2. A system as defined in claim 1 wherein said control means includes a pair of electronic gates connected with opposite polarities in parallel current paths forming part of said second circuit.

3. A system as defined in claim 2 wherein said electronic gates are solid-state thyratrons.

4. A system as defined in claim 1 wherein said control means is provided with a first input connected to said circuit means and a second input connected to a source of reference voltage, said circuit means having a voltage output opposing said reference voltage.

5. A system as defined in claim 4 wherein said source of reference voltage includes a generator responsive to the speed of said motor for stabilizing said speed under varying load.

6. A system as defined in claim 1 wherein said polyphase source has three phase conductors and said motor has three phase windings, two of said phase windings being serially connected between two of said phase conductors by said second circuit.

7. A regulating system for an induction motor with at least two phase windings, comprising a polyphase source of alternating current, a first circuit connecting one phase of said source across one of said phase windings, a second circuit connecting at least one other phase of said source across at least one other of said phase windings, control means including a pair of electronic gates connected with opposite polarities in parallel current paths forming part of said second circuit, and circuit means responsive to current flow in said first circuit for actuating said control means to regulate the speed of said motor through modification of the rate of energization of said other of said phase windings by said other phase of said source.

8. A system as defined in claim 7 wherein said electronic gates are solid-state thyratrons.

9. A system defined in claim 7 wherein said polyphase source has three phase conductors and said motor has three phase windings, two of said phase windings being serially connected between two of said phase conductors by said second circuit.

References Cited

UNITED STATES PATENTS

| 2,571,454 | 10/1951 | Jones et al. | 318—227 XR |
| 2,666,169 | 1/1964 | Jarvis | 318—230 XR |
| 2,960,644 | 11/1960 | Momberg et al. | 318—230 XR |

ORIS L. RADER, Primary Examiner

G. RUBINSON, Assistant Examiner

U.S. Cl. X.R.

318—230